J. REECE.
VARIABLE SPEED TRANSMISSION.
APPLICATION FILED DEC. 1, 1913.

1,181,165.

Patented May 2, 1916.
3 SHEETS—SHEET 1.

Witnesses.
M. R. Manning
E. F. Hotchkiss.

Inventor:
John Reece,
by Rogers, Kennedy & Campbell,
his Attorneys.

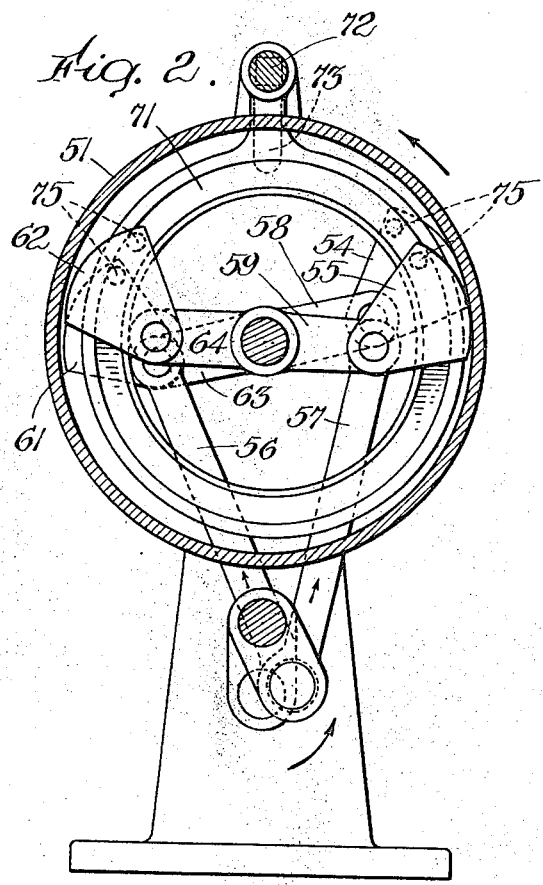
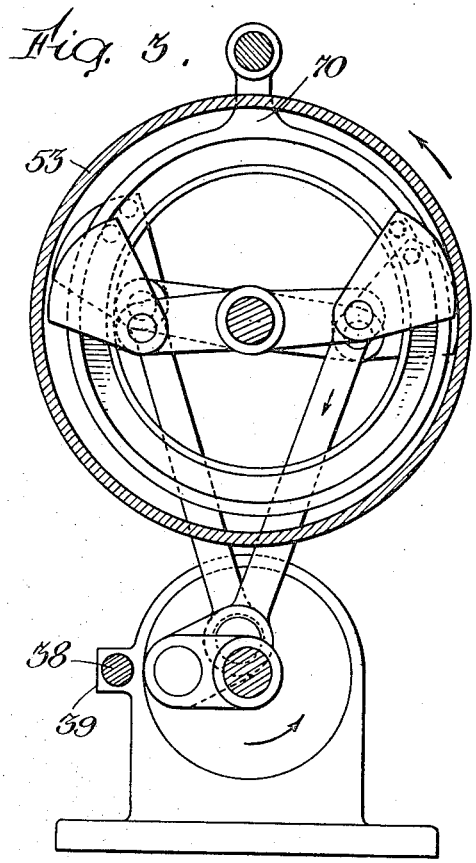
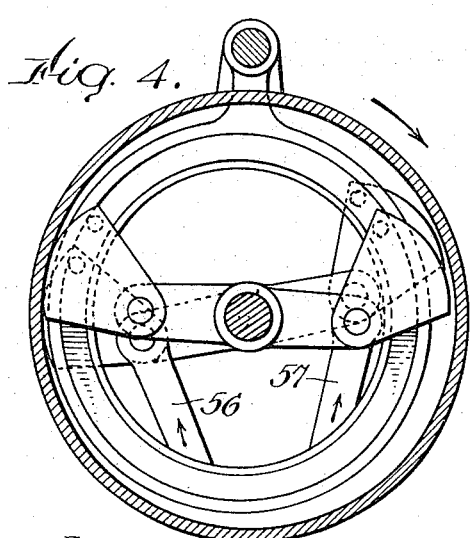
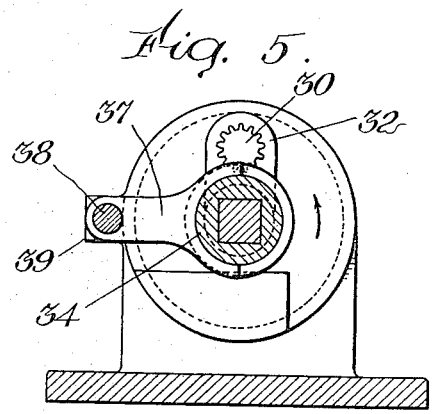

J. REECE.
VARIABLE SPEED TRANSMISSION.
APPLICATION FILED DEC. 1, 1913.

1,181,165.

Patented May 2, 1916.
3 SHEETS—SHEET 3.

Witnesses:
M. R. Manning
E. F. Hotchkiss.

Inventor:
John Reece,
by Rogers, Kennedy & Campbell
his Attorneys.

UNITED STATES PATENT OFFICE.

JOHN REECE, OF MANCHESTER, MASSACHUSETTS.

VARIABLE-SPEED TRANSMISSION.

1,181,165.  Specification of Letters Patent.  Patented May 2, 1916.

Application filed December 1, 1913. Serial No. 803,882.

*To all whom it may concern:*

Be it known that I, JOHN REECE, a citizen of the United States, residing at Manchester, in the county of Essex and State of Massachusetts, have invented certain new and useful Improvements in Variable-Speed Transmission, of which the following is a specification, reference being had therein to the accompanying drawing.

This invention relates to variable speed transmission and more particularly to mechanism for transmitting rotary motion from a driving shaft to a driven shaft with variable speed ratio. The two shafts may, for example, be respectively connected to the engine and to the wheels of a motor vehicle, the mechanism hereof permitting the speed of the vehicle to be controlled.

Generally the object hereof is to afford an improved and simplified variable speed transmission mechanism possessing good efficiency of transmission, easily adjustable for varying speed ratio, capable of giving any desired speed ratio between the higher and lower limits and free from the objections of heretofore known mechanisms.

To the attainment of these and other objects, the present improvement consists in the novel combinations, mechanisms, devices, arrangements and details hereinafter referred to and illustrated in the accompanying drawings.

First will be described one or more forms in which the present improvement may be embodied, and thereafter the novel features will be set forth in the claims.

Figure 1:
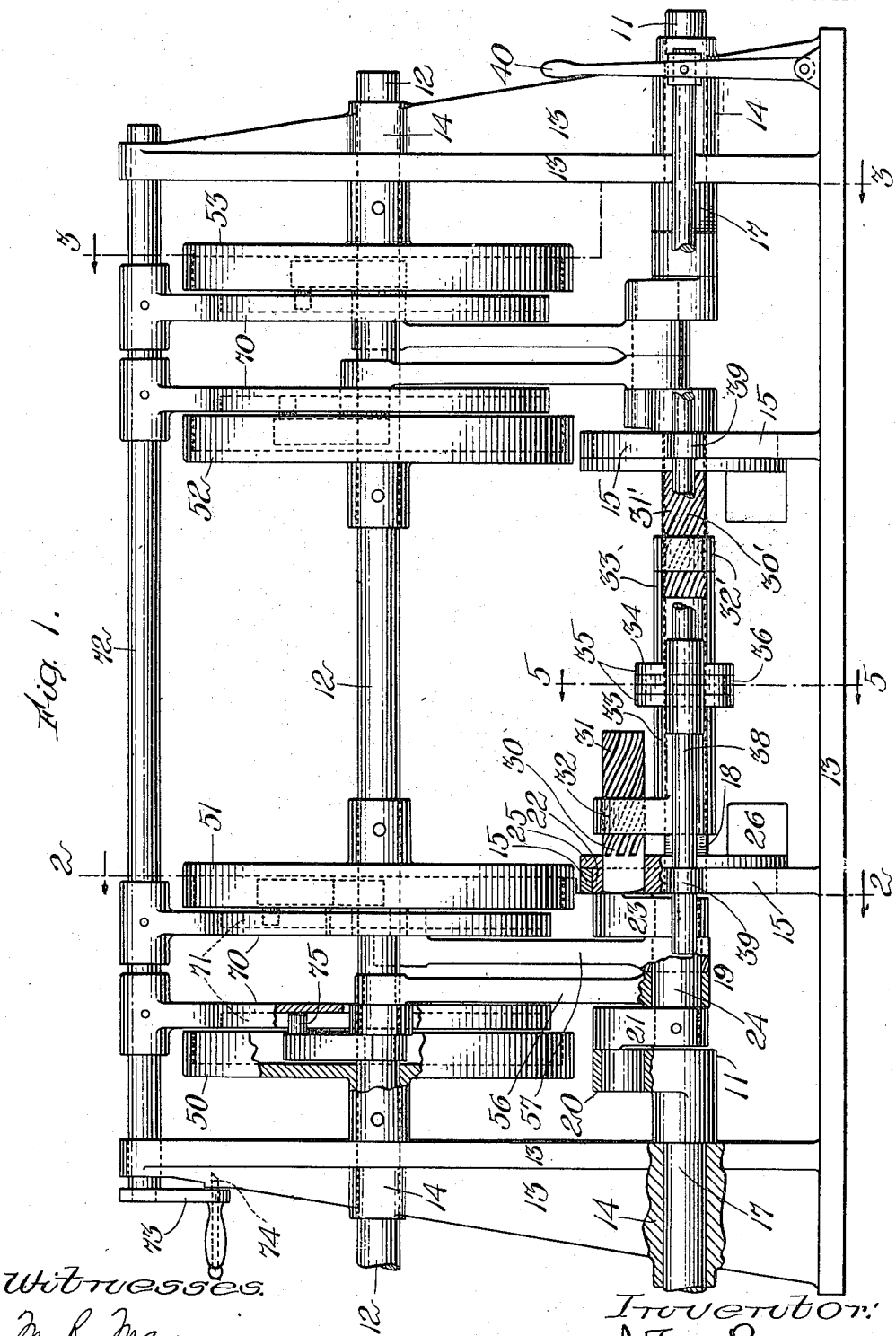
Figure 6:
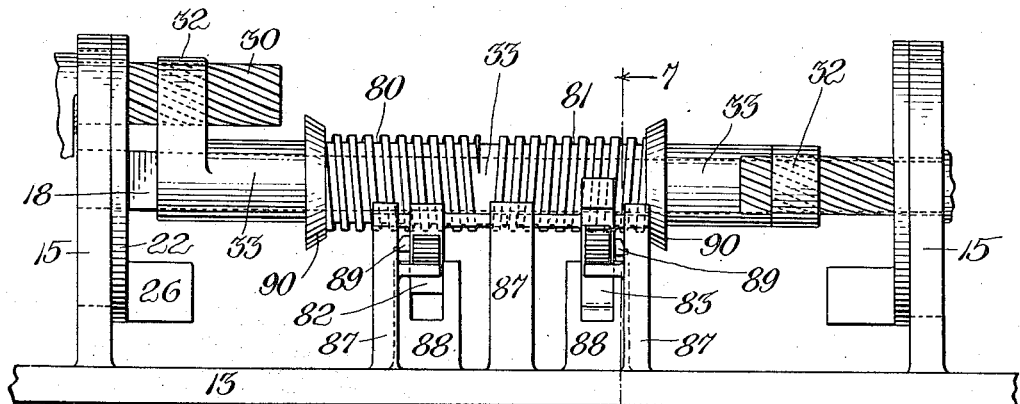
Figure 7:
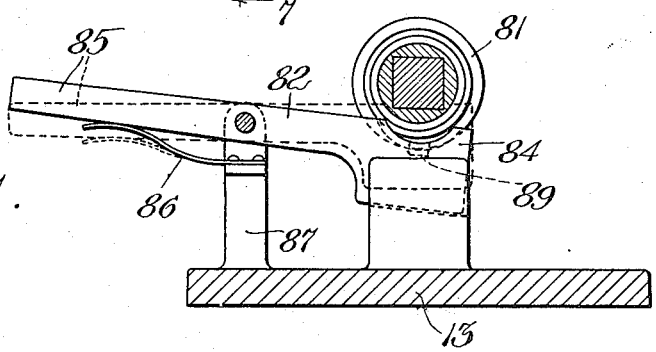
Figure 8:
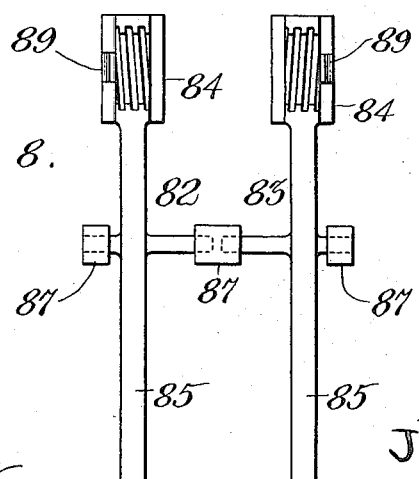

In the accompanying drawings forming a part hereof, Figure 1 is a general view, which may be considered a front view of a variable speed transmission mechanism embodying the present improvements. Fig. 2 is a transverse cross-section taken upon the plane 2—2 of Fig. 1. Fig. 3 is a similar transverse section taken on the plane 3—3 of Fig. 1. Fig. 4 is a similar transverse section corresponding to Fig. 2, but showing the parts adjusted for reversal of transmitted motion. Fig. 5 is a transverse section on the plane 5—5 of Fig. 1. In the above figures the adjustment for varying the speed of the driven shaft is effected by hand. The modification in Figs. 6, 7 and 8 is for effecting the physical work of adjustment by power, controlled by hand. Fig. 6 is, like Fig. 1, a front view, but showing only the particular parts of the apparatus involved in the modified means of adjustment. Fig. 7 is a transverse cross-section on plane 7—7 of Fig. 6. Fig. 8 shows the construction of the forward and reverse adjusting levers detached from the other parts and viewed from the top of Fig. 6.

The same reference numerals designate corresponding parts in the several figures of the drawings.

The combination illustrated in the drawings includes besides the continuously rotatable driving and driven shafts, a circularly moving device or rotary crank actuated by, or carried on the driving shaft, a rotary member or drum on the driven shaft, and connections from such device to such member whereby one shaft rotates the other, together with means for varying the action so as to alter the speed ratio of the shafts. The rotary member on the driven shaft is in the nature of a drum with which coöperates an intermittently acting or reciprocating gripper, the gripper being operated from the driving shaft for causing the drum and driven shaft to rotate. The device or crank which is actuated or carried by the driving shaft and has connections for reciprocating the gripper, is shown constructed to be radially enlargeable and diminishable by adjustment for varying its circumferential motion or speed, so that by controlling the effective length of radius of said device, the speed ratio of the two shafts is governed. The rotary drum by being fixed with the driven shaft, constitutes in effect a portion of the shaft. The gripper constitutes a movable part which positively engages and disengages the rotary drum. The gripper does not travel around and around with the driven shaft, but reciprocates at one side of the shaft, preferably in a concentric arc. Its intermittent engagement with the drum or other portion of the driven shaft is of a positive character, that is positive in action as a pawl engaging a ratchet in contradistinction to a mere frictional engagement. When the gripper is driving, the drum, the gripper and the gripper carrying arm are all substantially locked together.

Referring specifically to the drawings, it is seen that the driving shaft 11 and the driven shaft 12 are for convenience mounted in the same frame 13 which possesses bearings 14, 14, 14, 14, for the ends of the two shafts. The driving shaft also has support from circular bearings 15, 15, at intermediate points.

It being desired to employ a plurality of drums and grippers which may act successively, it is convenient to have a plurality of cranks on the driving shaft, thus dividing the shaft into end sections 17, 17, and a central section 18.

One form of radially enlargeable and diminishable rotary device is a crank with adjustable arms, and such a crank is generally indicated at 19, the driving shaft being provided with two of them between which is the central section 18 of the shaft. The crank pin is intended to be adjustable for varying the throw of the crank while the shaft is in rotation. This result may be effected by the following construction: Each crank arm may be jointed consisting of an arm portion 20 rigid with the end section 17 of the driving shaft and an arm portion 21 adjustable by swinging with relation to portion 20. The opposite crank arm comprises the arm portion 22 which is in the shape of a circular disk, so as to engage the circular bearing 15 for giving the driving shaft additional support, and swingingly connected with the arm portion 22 the adjustable arm portion 23. The crank pin 24 extends between the arm portions 21 and 23 at their extremities. Adjustment of crank throw is attained by swinging the jointed arm portions 21, 23, which moves the crank pin 24 more or less out of alinement with the driving shaft. The circular disk 22 referred to has a flange 25 bearing against the side of the circular bearing 15 and a weight 26 for counterbalancing the parts next to be referred to.

The relative swinging of the jointed portions of the crank arm is preferably effected by a contrivance comprising an extension 30 of the stud connecting the portion 23 with the disk 22, this extension having screw threads at 31 with an extremely high pitch, and being engaged by a screw threaded collar 32 which may be longitudinally adjusted to cause rotation of the stud 30, and thereby a relative swinging of the arm 23 for altering the throw of the crank. This adjustment is preferably effected by the following parts rotating with the driving shaft. The central shaft section 18 which is shown squared, is engaged by a square apertured sleeve 33 carrying the threaded collar 32. This sleeve has a circular enlargement at 34 from which extends outwardly one or two flanges 35. By pressing the flanges longitudinally of the shaft, the desired adjustments are effected. The right-hand end of sleeve 33 carries parts 30', 31', 32', corresponding to 30, 31 and 32, but arranged preferably at 90 degrees thereto. The following non-rotating parts may conveniently be used for the purpose. Engaging the flanges 35 is shown a yoke 36 carried upon an arm 37, which is secured to a sliding rod 38 movable longitudinally in bearings 39 formed for convenience at the periphery of the circular bearing 15. A right-handed extension of the rod 38 is connected to a handle 40 by which at will or automatically the described adjustments may be made, and the speed ratio of the two shafts thereby altered.

Referring now to the driven shaft, it is shown as having fixed to it so as to constitute substantially portions of the driven shaft, one or more drums 50, 51, 52, 53. These may be for convenience grouped in pairs, the pair 50, 51, driven from the crank at the left end of the driving shaft, and the other pair from the other crank. The two cranks are shown as set at ninety degrees from each other, and as will be seen the drums of each pair are acted upon alternately so that the four drums are engaged and driven in succession, thereby substantially affording a continuous driving connection between the two shafts. The momentum of the vehicle or driven parts will serve to maintain them in substantially uniform rotation, subject to readjustments of speed ratio. For each of the drums is a part or gripper which intermittently engages and disengages the drum, applying effort to it on each forward stroke. The description will be confined to the details for the pair of drums at the left, and those at the right may be similar. The different grippers are not supposed to operate simultaneously, but in successive order.

The gripper 54 which operates upon the drum 50 in forwardly driving the shaft 12, is shown as a sector-shaped piece capable of moving to and fro at one side of the driven shaft in proximity to interior surface of the drum 50. There is shown a similar part or gripper 55 in connection with the drum 51. These gripper parts are to be reciprocated by connections from the driving shaft, and for this purpose connecting rods 56 and 57 are shown for the grippers 54 and 55 respectively. Each gripper is to be guided concentrically in its to and fro movements, and for that purpose guiding arms or spokes 58, 59, may be employed, having hubs loosely mounted on the driven shaft. Each gripper is pivotally mounted on its guiding arm.

The action of each gripper may be substantially as follows: Taking for example the gripper 55 pivoted on the guide arm 59 and actuated by the connecting rod 57, it will be seen that the rotation of the driving shaft in the direction of the arrow causes the up and down reciprocation of the arm 59 and the gripper. As the parts are shown in Fig. 2, the parts 55, 57, 59 are being pushed upwardly. The curved surface of the gripper resting in contact with the interior surface of the drum, and the guide arm being mounted upon the shaft 12 which carries the drum, the upward pushing of the parts causes a toggle action which serves first to grip or positively engage the gripper with the drum, and thereupon to move them all in unison, causing the drum to rotate in the direction of the arrow. The action is positive and the transmission of power is substantially complete. The action is not merely one of friction, but rather a positive gripping, and there is no slippage. If the driven shaft should already be in a state of rotation and the speed ratio decreased, the grippers will be entirely inoperative, but when energy is being transmitted and the driven shaft is being speeded up or kept up to a designated speed, the grippers will effectively operate upon the drum to communicate driving action to the driven shaft on each upward advance stroke of the gripper. On the return or down stroke of the gripper manifestly the character of the connections is such that the gripper practically disengages the drum and becomes inoperative. In order to render the grippers 54 and 55 alternate in each action, the connecting rods are connected at diametrically opposite points of the guide arms as shown, so that gripper 54 is rising and operating when gripper 55 is descending and vice versa. As will later be described, means are provided for throwing the two grippers 54, 55, entirely out of action.

When it is desired to reverse the direction of rotation of the driven shaft without reversing the driving shaft, the forward grippers 54, 55, are thrown out of action, and in their place reversed grippers 61, 62, are forced into action. The reverse gripper 61 is carried upon an extension 63 of the guide arm 58, and incidentally the connecting rod 56 causes the reciprocation of the guide arm by connection with the extension 63 as shown. The reverse gripper 62 is likewise connected upon an extension 64 of the guide arm 59. When the reverse grippers are in operation the drums 50, 51, and therefore the driven shaft are rotated in the opposite direction. A convenient means for throwing the forward or reverse grippers into or out of action is a controller 70 one of which may be provided for each drum. This controller consists of an annular casting having a circular groove 71 and all of the controllers are supported from an adjustable rod 72 so as to stand adjacent to the respective drums. Referring to Fig. 2 the controller is shown adjusted into its right-hand position for forward driving. In this position it holds the reverse grippers inoperative. The controller may be shifted to neutral position, concentric with the drum, in which case none of the grippers will operate and the driven shaft is out of gear with the driving shaft. The rod 72 may be adjusted by any simple means such as a handle 73 for shifting it, and a locking device 74 for holding it in one or the other of its three positions. The controller operates upon the grippers through pins 75 extending from the grippers into the groove 71 of the controller. When the outer groove surface presses upon the pins as shown at the left side of Fig. 2, the grippers are held inoperative. On the other hand, the grippers at the right are operative, because there is no contact between the groove surface and the pins. Fig. 2 shows the forward grippers operative and the reverse grippers inoperative. By now swinging the controller completely to the left, the forward grippers will be rendered inoperative as seen in Fig. 4, while the reverse grippers will be rendered operative. In Fig. 4, therefore, the drum and driven shaft will rotate in the direction of the arrow and contrary to the rotation indicated in Fig. 2. If the controller is brought to middle or concentric position it neutralizes the action of all of the grippers, thereby operatively disconnecting the shafts.

In case it is desired to reduce the manual effort in shifting the sleeve 33 for adjusting the throw of the cranks upon the driving shaft, the sleeve acting expedient shown in Figs. 6 to 8 may be employed. As there shown, the sleeve 33 is provided with right and left hand screw thread portions 80 and 81, engaged respectively by the devices 82 and 83, either of which may be engaged with the screw threaded portion adjacent to it, so that the rotation of the driving shaft will cause the sleeve 33 to travel to right or left. Each of the sleeve shifting devices 82 and 83 consists of a movable head or socket 84 having interior screw threads corresponding with the threads 80 or 81, and an extension or handle 85 acted upon by a spring 86, and all mounted upon three supporting brackets 87. The arrangement is such that the spring normally holds the sleeve shifting devices inoperative, and permits either handle 85 to be depressed for rendering the device operative, so as to shift the sleeve to right or left thereby adjusting the throw of the cranks. When in depressed or inoperative position, the shifting devices 82, 83, descend into slotted brackets 88 which have upstanding arms securely holding the devices against longitudinal movement.

A safety device comprises the small beveled lug 89 upon each of the shifting devices 82, 83, arranged to be engaged by a beveled flange or collar 90 upon the sleeve 33, so that before any breakage can occur by excessive shifting of the sleeve, the collar 90 will engage the lug 89 to depress the latter and force the shifting devices 82 or 83 downward in inoperative position, disengaging it from the screw threads of the sleeve. Figs. 2 and 3 show the parts in corresponding position. In this position a gripper is driving drum 51 while the others are idle. A quarter revolution advance will bring 52 into driving action, 51 becoming idle. At the succeeding quarter 50 becomes active, and finally 53 at the fourth quarter.

It is to be understood that in describing the driving and driven shafts as continuously rotatable, it is intended to distinguish from shafts which advance intermittently, alternately moving and stopping. The driving shaft might sometimes, in the present invention, rotate without motion of the driven shaft, and likewise the driven shaft might continue in motion after the driving shaft is stopped.

It will thus be seen that there has been described a variable speed transmission mechanism embodying the principles and attaining the objects and advantages hereinbefore referred to, and other advantages will be apparent to those skilled in the art. Since many matters of design, arrangement, combination, detail and other features may be varied, without departing from the principles hereof, no limitation to such features is intended, excepting as set forth in the appended claims.

What is claimed is:

1. In a variable speed transmission a driving shaft having a crank radially enlargeable and diminishable by adjustment, said crank comprising a crank pin, together with one or more adjustable crank arms between the pin and shaft, and means operable during rotation of said shaft for effecting adjustment of the crank arms for varying the throw of the crank, said adjusting means comprising a sleeve rotatable with and movable longitudinally of the driving shaft, a non-rotatable device engaging said sleeve for shifting said sleeve, and connections between said sleeve and crank arm.

2. In a variable speed transmission a driving shaft having a crank radially enlargeable and diminishable by adjustment, said crank comprising a crank pin, together with one or more adjustable jointed crank arms between the pin and shaft, and means operable during rotation of said shaft for effecting adjustment of the crank arms by swinging one portion of the jointed crank arm relatively to the other for varying the throw of the crank, said adjusting means comprising a part rotatable with the driving shaft, a non-rotatable device engageable with said part for automatically shifting it and disengageable therefrom, and connections whereby the shifting of said part effects relative swinging of the crank arm parts.

In testimony whereof I affix my signature in presence of two witnesses.

JOHN REECE.

Witnesses:
  DONALD CAMPBELL,
  E. P. BERNHARDT.